US006265342B1

(12) United States Patent
Lim et al.

(10) Patent No.: US 6,265,342 B1
(45) Date of Patent: Jul. 24, 2001

(54) CATALYST FOR PURIFICATION OF EXHAUST GAS FROM DIESEL ENGINE

(75) Inventors: Chang-bin Lim; Chan-ho Pak, both of Seoul; Ju-hee Cho, Cheonan, all of (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 09/519,621

(22) Filed: Mar. 6, 2000

(30) Foreign Application Priority Data

Mar. 5, 1999 (KR) .................................................. 99-7254

(51) Int. Cl.[7] .............................. B01J 23/40; B01J 23/42; B01J 23/70; B01J 23/74; B01J 8/02
(52) U.S. Cl. .......................... 502/326; 502/336; 502/338; 502/339; 502/349; 502/352; 423/213.5
(58) Field of Search .................................... 502/325, 326, 502/327, 338, 339, 349, 439, 527.12, 527.15, 527.19, 336, 352; 423/213.5

(56) References Cited

U.S. PATENT DOCUMENTS

| | | | |
|---|---|---|---|
| 3,873,469 | * | 3/1975 | Foster et al. .................... 252/455 R |
| 4,096,095 | * | 6/1978 | Cairns .................................. 252/465 |
| 4,117,082 | * | 9/1978 | Matsuyama ........................... 423/247 |
| 4,237,032 | * | 12/1980 | Evans et al. .......................... 252/462 |
| 4,483,940 | * | 11/1984 | Ono et al. .............................. 502/159 |
| 4,492,769 | * | 1/1985 | Blanchard et al. .................. 502/262 |
| 4,749,671 | * | 6/1988 | Saito et al. .............................. 502/64 |
| 4,786,625 | * | 11/1988 | Imai et al. ............................ 502/326 |
| 5,059,575 | * | 10/1991 | Jorgensen et al. .................... 502/304 |
| 5,082,820 | * | 1/1992 | Mitsui et al. ......................... 502/350 |
| 5,409,671 | * | 4/1995 | Takemoto et al. ................... 422/180 |
| 5,427,989 | * | 6/1995 | Kanesaka et al. ..................... 502/66 |
| 5,750,459 | * | 5/1998 | Marella et al. ....................... 502/304 |

* cited by examiner

*Primary Examiner*—Steven P. Griffin
*Assistant Examiner*—Cam N. Nguyen
(74) *Attorney, Agent, or Firm*—The Law Offices of Eugene M. Lee, PLLC

(57) ABSTRACT

A catalyst for purifying exhaust gases from diesel engines with an improved purification efficiency for both nitrogen oxide and particulates in exhaust emissions is provided. The catalyst includes: (i) a first catalytic layer containing a carrier portion including iron (Fe)-doped modified zirconium dioxide, and a catalyst portion including a material selected from the group consisting of copper (Cu), copper oxide, and mixtures thereof, and (ii) a second catalytic layer containing a carrier portion including Cu-doped modified zirconium dioxide, a main catalyst portion including platinum (Pt) and tin (Sn), and a co-catalyst portion including copper oxide. The catalyst portion of the first catalytic layer may contain palladium (Pd) instead of Cu.

24 Claims, 8 Drawing Sheets

CATALYST FOR PURIFICATION OF EXHAUST GAS FROM DIESEL ENGINE

BACKGROUND OF THE INVENTION

1. Field of the Invention

The present invention relates to a catalyst useful for purifying exhaust gases from vehicles, and more particularly, to a catalyst useful for purifying exhaust gases from a diesel engine. The catalyst has increased efficiency for purifying both nitrogen oxide and soot particles (particulates) from the exhaust emissions of the diesel engine.

2. Description of the Related Art

There is an increasing world-wide interest in preserving the environment, along with other environmental concerns. One type of pollution, air pollution, as opposed to water and soil pollution, is caused primarily by combusters, (e.g., combustion engines), and is seriously affected by the stricture of the exhaust system of the combuster, the operating principle thereof, and weather conditions. A typical combuster which causes significant air pollution, is motor vehicle combustion engines.

The significance of the air pollution caused by vehicles is that vehicles emit pollutants wherever they go, and the use of vehicles sharply increases with improvement in living conditions. For this reason, various regulatory agencies have imposed restrictions on the exhaust emissions from vehicles. As a result of efforts made to satisfy and comply with these restrictions, development and use of a three-way catalyst and a lean burnt catalyst has achieved almost complete purification of carbon hydroxide, carbon monoxide and nitrogen oxide in the exhaust emissions from gasoline engines.

The problems associated with diesel engines, however, are different from the problems associated with gasoline engines. In addition, the use of diesel engines has greatly increased due to the high combustion efficiency of diesel and its low cost, when compared to gasoline. Due to the combustion principle of diesel engines which burn diesel under high-pressure, and in an oxygen-rich atmosphere, diesel engines emit solid and liquid composite pollutants such as soot particles (particulates), nitrogen oxides, soluble organic substances, sulfides, etc. In particular, particulates containing a carcinogenic substance such as a multinucleate aromatic substance are considered to be the most harmful exhaust emissions, and are emitted in the form of an undesirable visible smog. For this reason, there has been significant research into development of an exhaust gas purification system for diesel engines, which has been focused primarily on the development of a catalyst that is useful for removing such particulates.

Nitrogen oxides, another major component of the exhaust emissions from diesel engines, are considered to be the main portion of air pollution that causes acid rain, as well as the formation of ozone and smog by reaction with hydrocarbons. Nitrogen oxides can be eliminated by a reduction reaction. However, the presence of excessive oxygen relative to the oxygen equivalent required for oxidizing combustible carbonic compounds, such as un-burned hydrocarbons or carbon monoxide, hinders the natural elimination of nitrogen oxides via reduction. In addition, it is difficult to purify nitrogen oxides under a sulfur oxide ($SO_x$) atmosphere, and particularly, under a sulfur dioxide ($SO_2$) atmosphere.

Existing exhaust gas purification techniques for diesel engines typically are classified into two classes: (i) for burning particulate materials like soot and the like using a trap; and (ii) for burning soluble organic substances with a flow-through type catalyst produced by coating an open-cell honeycombed carrier with a catalyst. In particular, the trap for burning particulate materials is usually used exclusively for removing carbon from the particulates. For this reason, it cannot be used for removing the nitrogen oxides. In contrast, the flow-through type catalyst for burning organic substances is usually used to oxidize the soluble organic substances, in addition to the particulates, hydrocarbons and carbon monoxide. This oxidation process serves to eliminate these soluble organic substances, particulates, hydrocarbons, and carbon monoxide by using a metal catalyst in an oxide carrier, in a similar fashion to catalysts for gasoline engines. In addition, it is known that the use of the flow-through type catalyst can reduce nitrogen oxides to some extent.

However, since the existing flow-through type catalyst mainly burns the soluble organic substances, the reduction activity of the catalyst with respect to nitrogen oxides is merely at 20–30 percent of its oxidation activity with respect to particulates. This is believed to be because sulfur in diesel produces excessive sulfur dioxide, oxygen, and water in the exhaust emissions, which results in reduced activity and durability of the catalyst.

Catalysts useful for purifying exhaust gases from vehicles usually are comprised of a carrier and a main catalyst. Typical examples of the carrier, which has its inherent activity and is a decisive factor in determining the characteristics of the purification catalyst, include alumina, titanium dioxide, zirconium dioxide, silicon dioxide, and the like. Alumina, when used for diesel engines, however, has the disadvantage in that it adsorbs sulfur dioxide at low temperatures and emits sulfur trioxide at high temperatures via oxidation. This oxidation increases particulates in the exhaust emissions and reduces the activity and durability of the catalyst.

Titanium dioxide and zirconium dioxide, which are used alone or in a mixture, adsorb only a small amount of sulfur dioxide and produce only a small amount of sulfate, but exhibit a sharp reduction in their specific surface area at high temperatures.

These oxides therefore cannot sufficiently exert their functions as a carrier. In addition, titanium dioxide and zirconium dioxide lower the activity of precious metals and transition metals, and in turn deteriorate the catalyst. Silicon dioxide has a strong resistance against the toxicity of both sulfur dioxide and water, but due to its low activity, a large amount of catalyst needs to be impregnated therewith.

Catalysts useful for purifying exhaust gases from vehicles typically are comprised of precious metals. Platinum (Pt) and palladium (Pd), which are typical precious metals used in a three way catalyst for gasoline engines, are known as effective catalysts due to their considerably high purification activity with respect to nitrogen oxides, in addition to hydrocarbons and carbon monoxide. Accordingly, Pt and Pd have also been used widely for purification of the exhaust gas from diesel engines.

Although Pt has an advantage of exhibiting good purification activity for nitrogen oxide in diesel engines operating under an oxygen-rich atmosphere, it has a disadvantage in that it facilitates oxidation of sulfur dioxide at a temperature of 300° C. or more. Pt also serves as crystal nuclei for particulates, thereby increasing the amount of particulates in the exhaust. Adding vanadium oxides has been proposed to account for this problem, due to their ability to suppress the oxidizing power of sulfur dioxide. However, vanadium oxides reduce the oxidation activity for pollutants including particulates, hydrocarbons, and carbon monoxide, along with the oxidizing power of sulfur dioxide, thereby lowering the durability of the catalyst.

While Pd has an advantage in that it facilitates the oxidation activity for sulfur dioxide at fairly high temperatures, for example, at at least 450° C., it has a low oxidation activity for pollutants at low temperatures and a reduced durability at low temperatures.

In terms of cost and limited reserves of precious metals, there is a need for new substitutes for precious metals. However, since a main catalyst component capable of satisfactorily substituting for a precious metal has not yet been found, the amount of the precious metal used has been reduced with the aid of co-catalysts such as transition metals, rare earth metals, and oxides of these metals. However, these co-catalysts have a low initial activity, and are adversely affected by sulfur dioxide and water, which results in reduced durability.

SUMMARY OF THE INVENTION

There exists a need to develop a catalyst that can purify exhaust gases from diesel engines that is effective in eliminating both particulates and the nitrogen oxides. In addition, there exists a need to develop a catalyst capable of purifying exhaust gases from diesel engines by enhancing the oxidation efficiency of particulate materials, while at the same time preventing the formation of particulates by suppressing the oxidation of sulfur dioxide.

To solve the above problems, it is a feature of the present invention to provide a catalyst suitable for purifying exhaust gases from diesel engines that has the capability of improving the oxidation efficiency of soot particles (particulates), and that is capable of preventing additional production of the particulates by suppressing the oxidation of sulfur dioxide.

In accordance with these and other features of the present invention, there is provided in an embodiment of the present invention a catalyst useful for purifying exhaust gases from diesel engines comprising:

a first catalytic layer comprising a carrier portion including iron (Fe)-doped modified zirconium dioxide, and a catalyst portion including a material selected from the group consisting of copper (Cu), copper oxide, and mixtures thereof, and a second catalytic layer comprising a carrier portion including Cu-doped modified zirconium dioxide, a main catalyst portion including platinum (Pt) and tin (Sn), and a co-catalyst portion including copper oxide.

In accordance with an additional feature of the present invention, there is provided a catalyst useful for purifying exhaust gases from diesel engines comprising:

a first catalytic layer comprising a carrier portion including iron (Fe)-doped modified zirconium dioxide, and a catalyst portion including palladium (Pd); and a second catalytic layer comprising a carrier portion including Cu-doped modified zirconium dioxide, a main catalyst portion including platinum (Pt) and tin (Sn), and a co-catalyst portion including copper oxide.

In accordance with yet another feature of the invention, there is provided a catalyst useful for purifying exhaust gases from diesel engines, comprising at least two catalysts connected in series, whereby a first catalyst comprises:

a first catalytic layer comprising a carrier portion including iron (Fe)-doped modified zirconium dioxide, and a catalyst portion including a material selected from the group consisting of copper (Cu), copper oxide, and mixtures thereof; and a second catalytic layer comprising a carrier portion including Cu-doped modified zirconium dioxide, a main catalyst portion including platinum (Pt) and tin (Sn), and a co-catalyst portion including copper oxide; and whereby a second catalyst comprises a first catalytic layer comprising a carrier portion including iron (Fe)-doped modified zirconium dioxide, and a catalytic portion including palladium (Pd); and a second catalytic layer comprising a carrier portion including copper (Cu)doped modified zirconium dioxide, a main catalyst portion including platinum (Pt) and tin (Sn), and a co-catalyst portion including copper oxide.

In accordance with yet another feature of the present invention, there is provided an exhaust system for a diesel engine comprising a gas inlet portion and a gas outlet portion, whereby the exhaust system includes the above-mentioned catalyst that contains at least two catalysts connected in series, where the first catalyst is a high-temperature active catalyst disposed in the gas inlet portion, and the second catalyst is a low-temperature active catalyst disposed in the gas outlet portion.

These and other features of the present invention will be readily apparent to those skilled in the art upon reading the detailed description that follows.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE INVENTION

Figure 1:
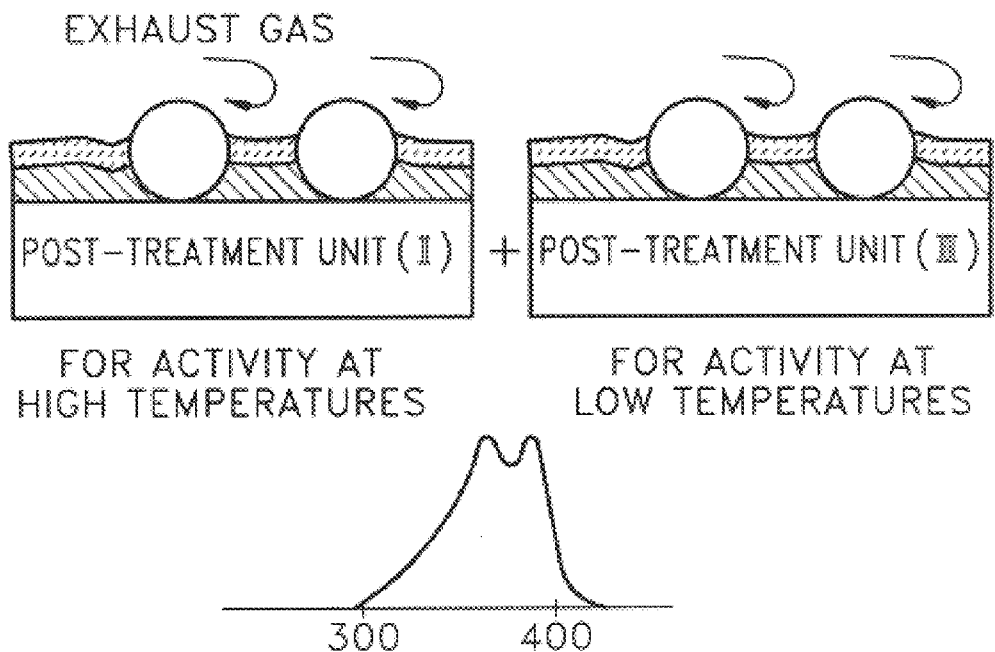
FIG. 1 illustrates a schematic view of a flow-through type catalyst prepared in accordance with example 8.
Figure 1:
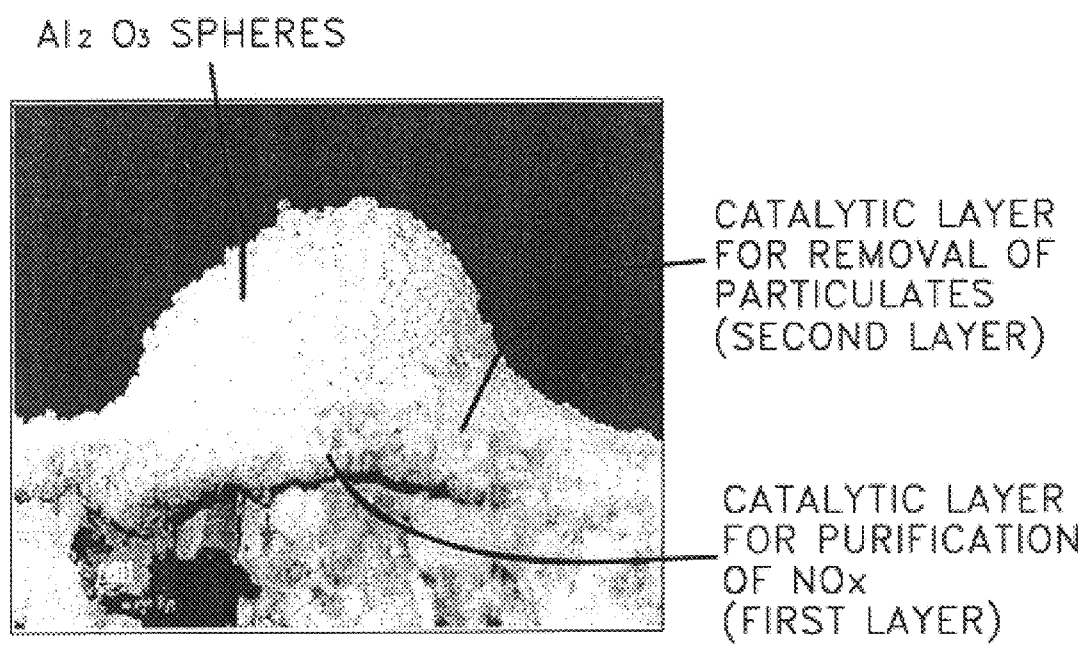

Korean patent application No. 99-7254, filed on March 5, 1999, and entitled: "Catalyst for Reduction of Exhaust Gas From Diesel Engine," is incorporated by reference herein in its entirety.

The present invention relates to catalysts useful for purifying exhaust gases from diesel engines, whereby the catalyst includes:
- a first catalytic layer comprising a carrier portion including iron (Fe)-doped modified zirconium dioxide, and a catalyst portion including a material selected from the group consisting of copper (Cu), copper oxide, and mixtures thereof; and
- a second catalytic layer comprising a carrier portion including Cu-doped modified zirconium dioxide, a main catalyst portion including platinum (Pt) and tin (Sn), and a co-catalyst portion including copper oxide.

It is preferred that the Cu, copper oxide, or mixtures thereof in the first catalytic layer is/are present in an amount within the range of from about 0.5 to about 5 wt %, based on the weight of the carrier portion in the first catalytic layer. It also is preferred that the catalyst is a high temperature active catalyst.

The invention also relates to catalysts useful for purifying exhaust gases from diesel engines, whereby the catalyst includes:
- a first catalytic layer comprising a carrier portion including iron (Fe)-doped modified zirconium dioxide, and a catalyst portion including palladium (Pd); and
- a second catalytic layer comprising a carrier portion including Cu-doped modified zirconium dioxide, a main catalyst portion including platinum (Pt) and tin (Sn), and a co-catalyst portion including copper oxide.

It is preferred that the Pd in the first catalytic layer is present in an amount within the range of from about 0.2 to about 0.8 wt %, based on the weight of the carrier portion in the first catalytic layer. It also is preferred that this catalyst is a low temperature active catalyst.

Preferably, for the high-temperature active catalyst and the low-temperature active catalyst, the Fe-doped modified zirconium dioxide and/or the Cu-doped modified zirconium dioxide comprise $SO_4^{2-}$ in an amount of from about 1 to about 5 wt %, based on the weight of the Fe-doped modified zirconium dioxide and/or the Cu-doped modified zirconium dioxide. It also is preferred for each of these catalysts that the Fe-doped modified zirconium dioxide and/or the Cu-doped modified zirconium dioxide has a specific surface area of about 80 to about 130 m²/gram. Preferably, for the high-temperature active catalyst and the low-temperature active catalyst, the Fe in the carrier portion in the first catalytic layer is present in an amount within the range of from about 3 to about 6 wt %, based on the weight of the modified zirconium dioxide in the first catalytic layer.

Preferably, for the high-temperature active catalyst and the low-temperature active catalyst, the Cu in the carrier portion of the second catalytic layer is present in an amount within the range of from about 3 to about 6 wt %, based on the weight of the modified zirconium dioxide in the second catalytic layer. It also is preferred for the high-temperature active catalyst and the low-temperature active catalyst, that each of the Pt and Sn in the second catalytic layer is present in an amount within the range of from about 0.05 to about 0.3 wt %, based on the weight of the carrier portion of the second catalytic layer. Preferably, for the high-temperature active catalyst and the low-temperature active catalyst, the copper oxide in the co-catalyst portion of the second catalytic layer has an average particle size within the range of from about 0.1 to about 10 μm, and the copper oxide is present in an amount within the range of from about 10 to about 30 wt %, based on the weight of the main catalyst portion of the second catalytic layer.

It also is preferred in the present invention that the first catalytic layer of both the high temperature and the low temperature active catalyst is coated on a heat-resistant three-dimensional structure along with alumina spheres having an average particle size within the range of from about 50 to about 100 μm, and the second catalytic layer is coated on the first catalytic layer. Preferably, the alumina spheres are present in an amount within the range of from about 5 to about 30 wt %, based on the weight of the carrier portion of the first catalytic layer. Preferably, the heat-resistant three-dimensional structure is one selected from the group consisting of an open-flow ceramic honeycombed structure, a wall-flow ceramic honeycomb monolithic structure and an open-flow metal honeycombed structure.

The present invention also pertains to a combined catalyst that comprises the high temperature active catalyst connected in series to the low temperature active catalyst. This feature is particularly useful in an exhaust system from a diesel engine having a gas inlet portion and a gas outlet portion, whereby the high temperature active catalyst is disposed at the gas inlet portion, and the low temperature active catalyst is disposed at the gas outlet portion.

Zirconium dioxide powder initially has a low solid acidity, but shows a catalytic activity by addition of a metal oxide. However, as described previously, zirconium dioxide reduces the activity of precious metals and transition metals that are typically impregnated into the carrier as a main catalyst portion. In addition, the catalytic activity of zirconium dioxide disappears at a temperature of about 600° C., due to a reduction in the specific surface area at this temperature, which results in a reduced durability of the catalyst. Thus, the present invention provides a modified zirconium dioxide with an improved activity at high temperatures, the specific surface area of which is not reduced at high temperatures. In the present invention, the modified zirconium dioxide preferably is obtained by adding a predetermined amount of $SO_4^{2-}$ into the lattice of the zirconium dioxide powder.

The low acidity of the modified zirconium dioxide of −5 or more, (Hammet acidity function), which is fairly low compared to the activity of solid super acid of −14, enables partial oxidation of hydrocarbons or carbon monoxide. This lower acidity of the modified zirconium dioxide also improves the reduction activity for nitrogen oxides, and results in a higher degree of oxidation for particulates, including carbon and soluble organic substances.

Also, when the modified zirconium dioxide is doped with iron (Fe) and/or copper (Cu), which have their own active sites, and then preferably thermally treated, phase transition from a monoclinic to a tetragonal shape is believed to occur due to excessive electrons produced in modified zirconium dioxide. As a result, $_0O^{2-}$ ions having a strong activity are derived, further improving the oxidation activity.

Iron is a metal that is effective in partially oxidizing hydrocarbons. Thus, a carrier prepared by impregnating the modified zirconium dioxide with iron oxide also is effective at partially oxidizing hydrocarbons. In addition, carbon monoxide produced by the partial oxidation of hydrocarbons increases the reduction activity for nitrogen oxide, but more particularly, increases the reduction activity for nitrogen oxide in a temperature range of from about 400 to about 500° C. In contrast to the excellent reduction activity for nitrogen dioxide, the power of oxidation for sulfur dioxide is relatively low at any temperature. Thus, it is preferable to dope a carrier portion of a first catalytic layer with Fe. As for the catalyst portion of the first catalytic layer, Cu can be used for the activity at high temperatures, and palladium (Pd) for the activity at low temperatures.

Cu is a metal having a higher reduction activity for nitrogen oxide. In a carrier prepared by impregnating the modified zirconium dioxide with copper oxide, reduction of nitrogen oxide and consumption of hydrocarbons occurs at or about the same temperature range. Thus, by using both Fe that produces carbon monoxide by oxidizing hydrocarbons, and Cu having a higher power of reduction for nitrogen oxide in a predetermined ratio, the power of reduction for nitrogen oxide can be improved even in an oxidation atmosphere. Thus, it is preferable to impregnate a first catalytic layer of a high-temperature active catalyst, which preferably is located at an exhaust gas inlet portion due to its activity, (for example in a temperature range of 380 to 420° C.), with Cu as a main catalyst.

For a first catalytic layer of a low-temperature active catalyst, which preferably is located at an exhaust gas outlet portion due to its activity, (for example in a temperature range of 250 to 320° C.), Pd, which has good activity at low temperatures and oxidation inhibition capability for sulfur dioxide, is preferred for use in the main catalyst for a higher purification efficiency for nitrogen oxide at a specific temperature.

A second catalytic layer preferably includes a carrier portion including modified zirconium dioxide doped with Cu, a main catalyst portion including a mixture of Pt and tin (Sn), and a co-catalyst portion including copper oxide. Those skilled in the art are capable of fabricating the respective carrier portions, main catalyst portions and co-catalyst portions to include the aforementioned components, using the guidelines provided herein. In addition, skilled artisans will recognize that all of the catalyst portions in the first and second catalytic layers (as well as in other catalytic layers), may contain other components useful in achieving the features of the present invention.

By combining the carrier of modified zirconium dioxide doped with Cu, a main catalyst portion including Pt having a good oxidation activity at high temperatures and Sn having a good activity in the presence of moisture with oxidation inhibition capability for sulfur dioxide, and copper oxide (CuO) as a co-catalyst, the toxicity of the exhaust can be suppressed, and a large amount of oxygen ions can be produced, resulting in an improved oxidation activity for particulates. In particular, the presence of CuO with a large particle size (preferably ranging from about 0.1 to about 10 $\mu$m) in the main catalyst portion prevents aggregation of Pt particles having activity at low temperatures, which results in an improved durability at high temperatures.

Thus, by coating the first catalytic layer for purification of nitrogen oxide, which has the foregoing features, on a heat-resistance, (e.g., heat resistant), honeycombed 3-dimensional structure, and in turn coating the second catalytic layer for purification of particulates thereon, and by activating both the catalyst for nitrogen oxide purification (having activity at a temperature of 300 to 400° C.) and the catalyst for particulate purification (having an activity at a temperature of 400° C. or less) in a predetermined temperature range, oxidation of hydrocarbons and reduction of nitrogen oxide occurs. This reduction of nitrogen oxide in turn generates heat, and particulates are burnt, which results in a localized reduction atmosphere with a synergistic effect in that the reduction efficiency of nitrogen oxide is improved and the combustion temperature of particulates is lowered.

When coating the catalyst for nitrogen oxide purification and the catalyst for particulate purification on a heat-resistance honeycombed 3-dimensional structure, alumina spheres may be coated thereon at the same time, which temporarily holds the gaseous and particle substances of the exhaust gas in the catalyst layers. This results in an improved purification ratio for nitrogen oxide, and improved combustion capability for particulates. Preferably, the alumina spheres are present in an amount within the range of from about 5 to about 30 wt %, based on the weight of the carrier portion in the first catalytic layer, (i.e., the carrier portion including the Fe-doped modified zirconium dioxide). If the amount of alumina spheres added exceeds this range, the catalytic activity may be lowered.

Also, two catalysts for purifying nitrogen oxide, each having a first catalytic layer capable of reducing nitrogen oxide at different temperature ranges, (e.g., one being a high temperature active catalyst, and the other being a low temperature active catalyst), can be linked in series. When linking these catalysts in series, it is preferred that the catalyst having high-temperature catalytic activity be disposed at an exhaust gas inlet portion, and the catalysts having low temperature catalytic activity be disposed at an exhaust gas outlet portion. Placing the respective catalysts in this manner extends the activity temperature range for nitrogen oxide reduction, which results in an improved activity for nitrogen oxide reduction.

The present invention now will be described in greater detail with reference to the following examples and comparative examples. The following examples are for illustrative purposes and not intended to limit the scope of the invention.

EXAMPLE 1

Catalyst for Removal of Particulates

Approximately 11.41 g of $Cu(NO_3)_2 \cdot 3H_2O$ was dissolved in 100 ml of deionized water, mixed with a modified zirconium dioxide containing 4 wt % $SO_4^{2-}$ (specific surface area: 80–130 $m^2/g$), and then dried. The dried product was calcined at 500° C. for 3 hours to provide a carrier powder doped with 3 wt % Cu (hereinafter, referred to as Cu—Z4).

Following this, 0.18 g of $[Pt(NH_3)_4]Cl_2$ and 0.19 g of $SnCl_3 \cdot 3H_2O$ were dissolved in 40 ml of ethyleneglycol solution (100%), mixed with the Cu—Z4 carrier powder obtained above, and then dried. The resultant product was calcined at 500° C. for 3 hours to add Pt and Sn each in an amount of about 0.1 wt %, as main catalysts, to the Cu—Z4 carrier powder.

CuO powder having an average particle size of 0.1 to 10 $\mu$m then was added to the resultant product in an amount of 30% by weight of the main catalyst added to the Cu—Z4 carrier powder, to produce a catalyst 0.1Pt-0.1Sn/Cu—Z4/30CuO for use in removing particulates in exhaust emissions.

EXAMPLE 2

High-Temperature Active Catalyst for Purification of Nitrogen Oxide

A modified zirconium oxide with 4 wt % $SO_4^{2-}$ (specific surface area of 80–130 $m^2/g$) was mixed with a $Fe(NO_3)_2$ solution, dried and calcined at 500° C. for 3 hours to produce a carrier powder doped with 3 wt % $Fe_2O_3$ (hereinafter, referred to as Fe—Z4).

Following this, 11.41 g of $Cu(NO_3)_2 \cdot 3H_2O$ was dissolved in 100 ml of deionized water. The resulting solution was added dropwise to 100 g of the Fe—Z4 powder obtained above, stirred and dried. The dried product was calcined at 500° C. for 3 hours to produce a catalyst 3Cu/Fe—Z4 which had activity at high temperatures for nitrogen oxide.

EXAMPLE 3

Low-Temperature Active Catalyst for Purification of Nitrogen Oxide

The process of example 2 was repeated except that 0.6 wt % Pd was used instead of 3 wt % Cu, to produce a catalyst 0.6Pd/Fe—Z4 which had activity at low temperatures for nitrogen oxide.

EXAMPLE 4

The catalyst powder obtained in Example 1 (2.0 g), and 0.1 g of particulates from exhaust emissions were compressed by a force of 0.5 kgf/cm² to form pellets. The pellets were milled and sieved to obtain particles having a size of 1–2 mm. The removal ratio of particles was measured.

EXAMPLE 5

The catalyst powder obtained in Example 1 (200 g) was mixed with 500 ml of deionized water to obtain a catalyst slurry. The slurry was coated on a honeycomb structure having 400 cells per square inch of cross-section. The honeycomb structure coated with the slurry was dried and then calcined at 500° C. for 2 hours, resulting in a catalytic layer for removing particulates on the honeycomb structure.

EXAMPLE 6

A catalytic layer for purification of nitrogen oxide at high temperatures was prepared as in example 5, except that 200 g of the catalyst powder obtained in example 2 was mixed with 500 ml of deionized water to obtain a catalyst slurry, and alumina spheres having a particle size of 50 to 100 $\mu$m were added in an amount of 10 wt %, based on the weight of the carrier powder.

EXAMPLE 7

A catalytic layer for purification of nitrogen oxide at low temperatures was prepared as in example 6, except that the catalyst powder obtained in example 3 was used instead of the catalyst powder from example 2.

EXAMPLE 8

As illustrated in FIG. 1, a high-temperature active catalyst for use in an exhaust gas inlet portion of diesel engines and a low-temperature active catalyst for use in an exhaust gas outlet portion of diesel engines were prepared. For the high-temperature active catalyst, the catalytic layer formed in example 6 was coated with the catalyst slurry for removing particulates prepared in example 5 by a dipping method. For the low-temperature active catalyst, the catalytic layer formed in example 7 also was coated with the catalyst slurry for removing particulates prepared in example 5 by a dipping method.

Following this, the high-temperature active catalyst and the low-temperature active catalyst were linked in series to form a flow-through type catalyst expressed as (0.1Pt-0.1Sn/Cu—Z4)/(3Cu/Fe—Z4)+(0.1Pt-0.1Sn/Cu—Z4)/(0.6Pd/Fe—Z4).

For comparison, catalysts having about twice the particulate removal efficiency (approximately 40%) relative to a general post-treatment catalyst, were selected from the catalysts prepared in the above examples. For the selection, each catalyst was loaded into a supercharged direct injection type I-6-cylinder diesel engine (displacement 11,100 cc) supplied with diesel containing 0.25 wt % sulfur. Then, a predetermined particulate removal performance test was carried out.

COMPARATIVE EXAMPLE 1

A solution of $Cr(NO_3)_3.9H_2O$ was dissolved in deionized water, (200 wt % based on the weight of $TiO_2$ powder), mixed with $TiO_2$ powder having a specific surface area of 250 to 350 m²/g, and stirred to impregnate the $TiO_2$ powder with Cr to a loading of 3 wt %. The resulting slurry was dried and calcined at 500° C. for 5 hours to obtain a Cr-doped carrier powder. For the main catalyst portion, $Fe(NO_3)_2$ and $Pt(NH_3)_4Cl_2.H_2O$ were dissolved in an ethylene glycol solution, (40 wt % based on the weight of the initial $TiO_2$), to impregnate the Cr-doped $TiO_2$ carrier powder with Fe and Pt, respectively, to a loading of 3 wt % and 0.5 wt %, respectively. After the Fe and Pt impregnation, the same drying and calcination procedures were repeated. NiO powder having a particle size of 0.1 to 10 $\mu$m was added in an amount of 30 wt % based on the weight of the Cr-doped $TiO_2$ carrier powder to produce a composite catalyst expressed as 3Fe-0.5Pt/Cr—$TiO_2$+30NiO.

COMPARATIVE EXAMPLE 2

The process of comparative example 1 was followed except that $Pd(NO_3)$, $Pr(NO_3)_2.6H_2O$, $Ce(NO_3)_2.6H_2O$, $Cu(NO_3)_2.3H_2O$ and $NH_4VO_3$ were separately dissolved in a 40 wt % ethylene glycol solution, and added to $TiO_2$ powder having a specific surface area of 250 to 350 m²/g to impregnate the $TiO_2$ powder separately with Pd, Pr, Ce, Cu and V to a loading of 2 wt %, 5 wt %, 5 wt %, 10 wt %, and 15 wt %, respectively.

COMPARATIVE EXAMPLES 3 AND 4

Catalyst pellets with particulates were prepared in accordance with the process of example 4, except that the catalyst powders from comparative examples 1 and 2 were used, respectively.

COMPARATIVE EXAMPLES 5 AND 6

The process of example 5 was followed except that the catalyst powders from comparative examples 1 and 2 were used, respectively.

(1) Catalytic Activity Testing

The combustion activity for particulates and the purification activity for nitrogen oxide were measured under the following conditions:

Gas Composition: 500 ppm $NO_x$; 800 ppm HC; 2000 ppm CO; 200 ppm $SO_2$; 10% $H_2O$; 10% $O_2$; He balance Reaction Temperature: 200 to 600° C.

Space Velocity: 40,000/h

Analysis of the effluent was carried out to determine the amount of $CO_2$ produced, the degree of $SO_2$ oxidation, and the degree of $NO_x$ reduction. A non-dispersive infra-red analyzer was used for the measurement of the amount of $CO_2$ and the degree of $SO_2$ oxidation, and a chemiluminescent detector analyzer was used for the degree of $NO_x$ reduction. The results of this analysis are presented in FIGS. 2A through 7B.

Figure 2A:
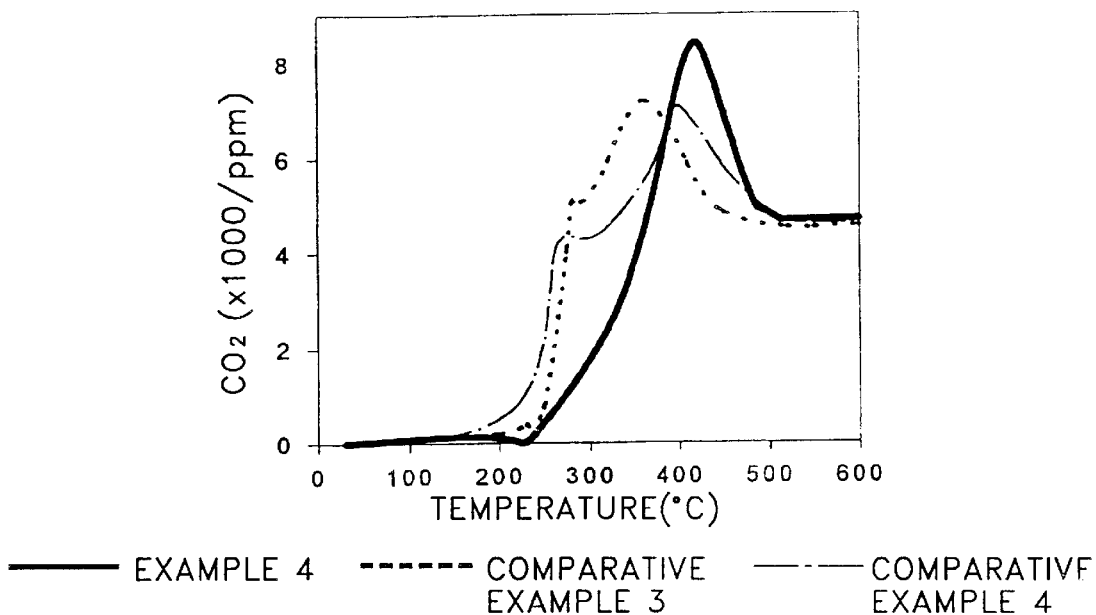
FIGS. 2A and 2B are graphs illustrating the combustion temperature of particulates, and the degree of $SO_2$ oxidation, respectively, for the catalysts prepared in accordance with example 4 and comparative examples 3 and 4.
Figure 2B:
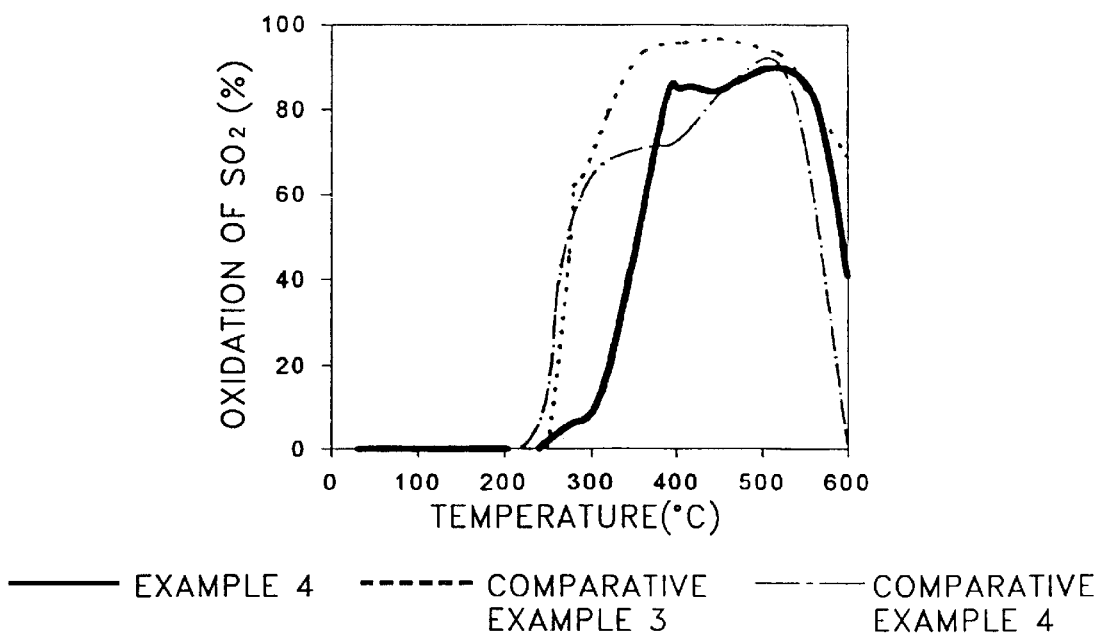

FIGS. 2A and 2B illustrate the analysis results for example 4 and comparative examples 3 and 4. Referring to FIG. 2A, the combustion temperature of particulates for the catalyst of example 4 was similar to that of comparative example 3 at about 425° C. However, FIG. 2A also clearly shows that the catalyst of example 4 had a vigorous reactivity to produce $CO_2$ from particulates, while the catalysts of comparative examples 3 and 4 had a temporal resting stage near 270° C. in the combustion of particulates. Referring to FIG. 2B, the catalyst of example 4 exhibited a good $SO_2$ oxidation inhibition effect at low temperatures compared to the catalysts of comparative examples 3 and 4.

Figure 3A:
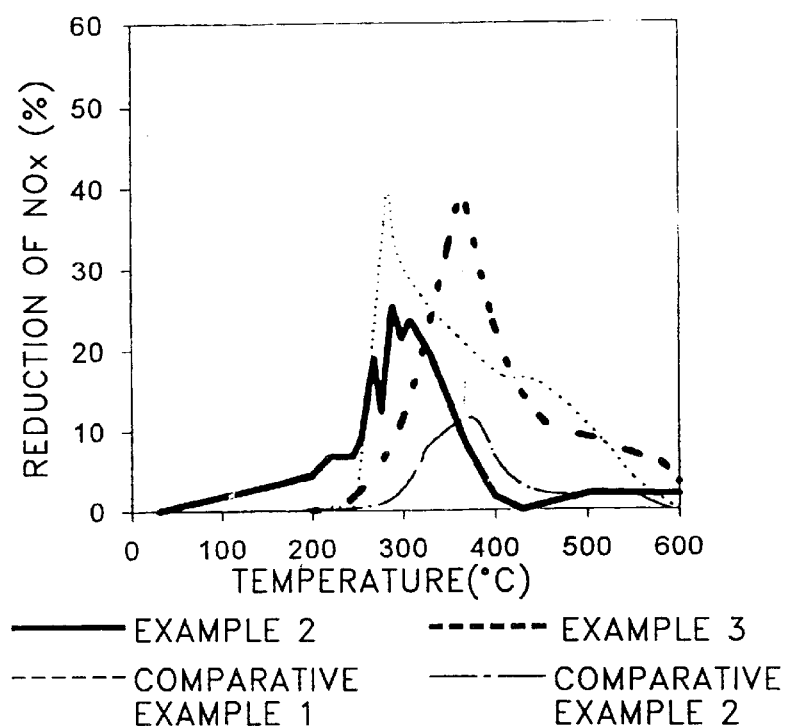
FIGS. 3A and 3B are graphs illustrating the degree of nitrogen oxide reduction, and the degree of $SO_2$ oxidation, respectively, for the catalysts prepared in accordance with examples 2 and 3 and comparative examples 1 and 2.
Figure 3B:
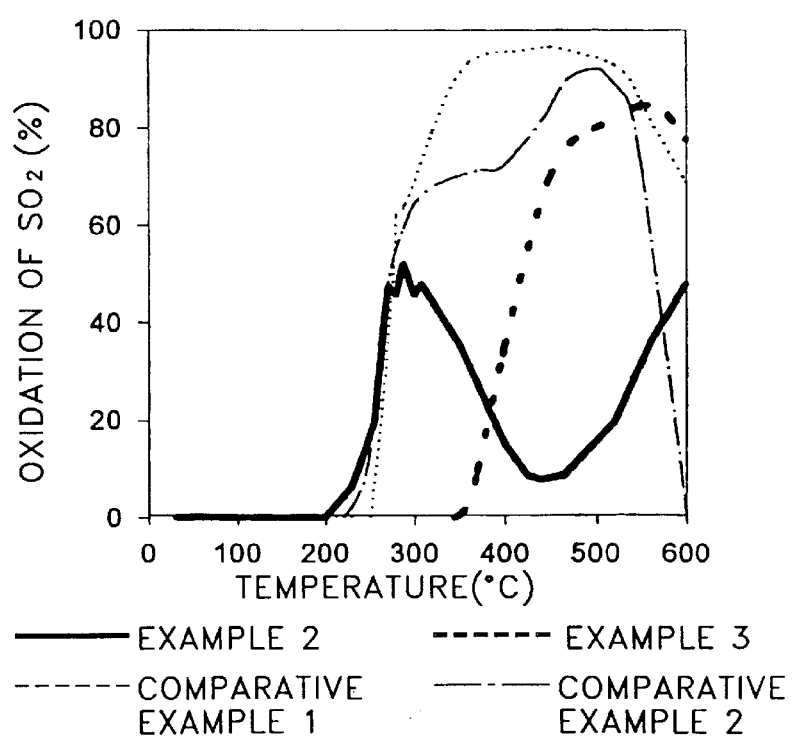

FIGS. 3A and 3B illustrate the analysis results for examples 2 and 3 and comparative examples 1 and 2. As shown in FIG. 3A, the degree of nitrogen oxide reduction by the catalysts of examples 2 and 3 was about 25 to 40%, which is lower than that by the catalyst of comparative example 1. However, the catalyst of example 3 exhibited the highest degree of nitrogen oxide reduction at 370° C. which is close to the average temperature of exhaust gas during traveling of diesel engines. In addition, although the catalyst of example 2 showed the highest reduction of nitrogen oxide at a lower temperature of 290° C. than for example 3, its effects on $SO_2$ oxidation was advantageous with a lower degree of $SO_2$ oxidation.

Figure 4A:
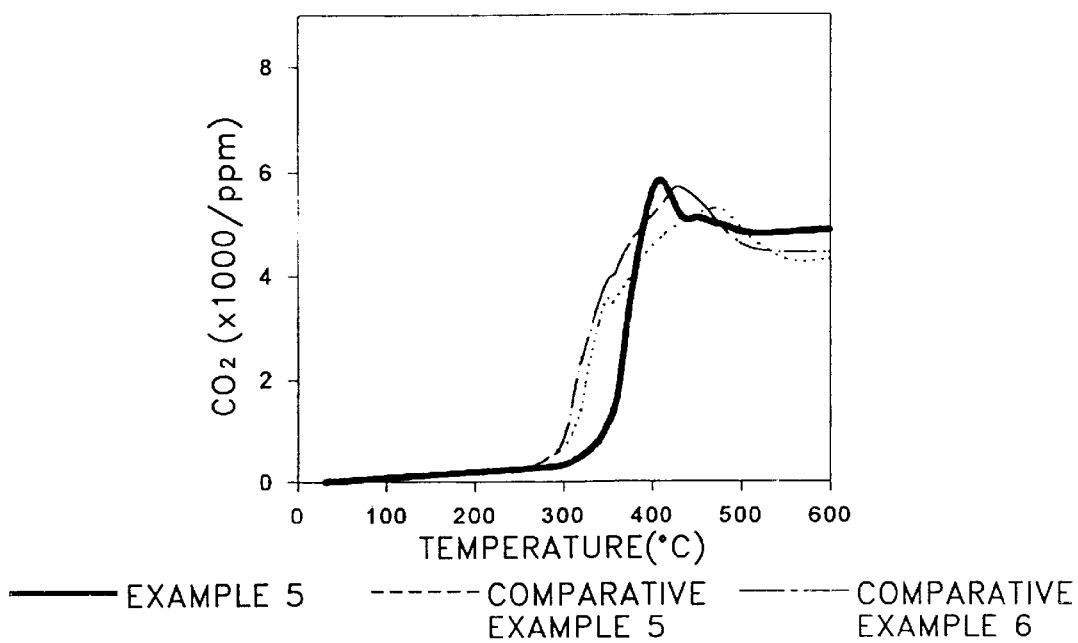
FIGS. 4A and 4B are graphs illustrating the combustion temperature of particulates, and the degree of $SO_2$ oxidation, respectively, for the catalysts prepared in accordance with example 5 and comparative examples 5 and 6.
Figure 4B:
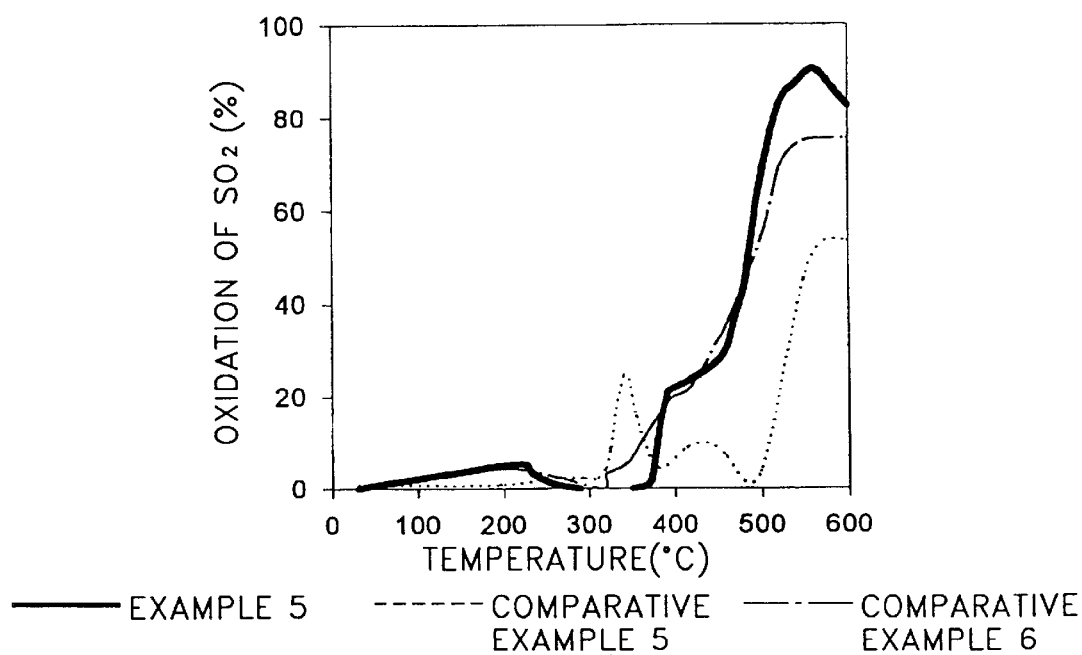

FIGS. 4A and 4B illustrate the analysis results for example 5 and comparative examples 5 and 6. As shown in FIG. 4A, the combustion temperature of particulates was lower at about 405° C. for the catalyst of example 5 compared to that of comparative examples 5 and 6, and the steep curve for example 5 assures a good reactivity during the burning of particulates. Also, the degree of $SO_2$ oxidation for example 5 was as low as about 20% at a temperature of 400° C. or less.

Figure 5A:
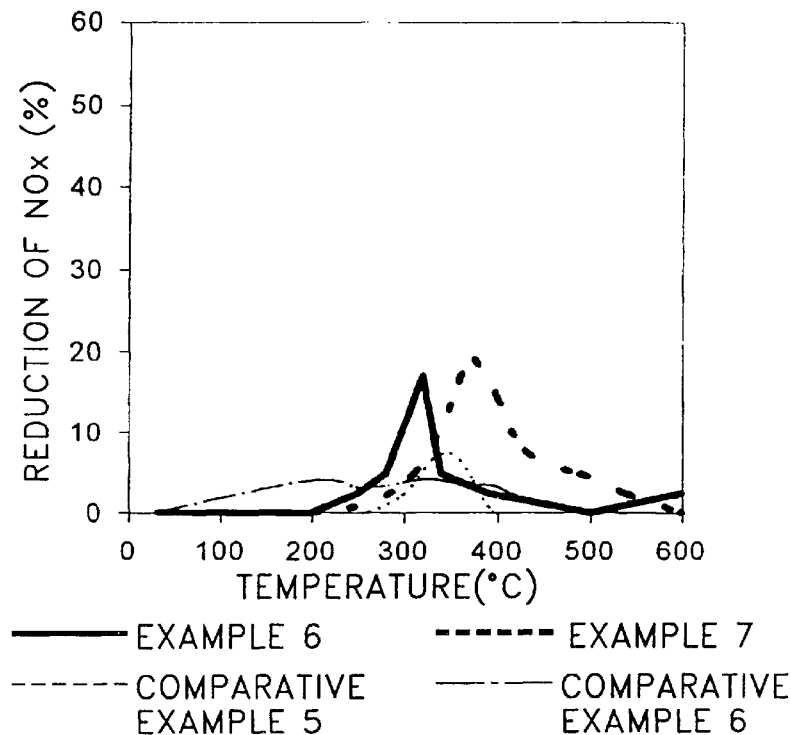
FIGS. 5A and 5B are graphs illustrating the degree of nitrogen oxide reduction, and the degree of $SO_2$ oxidation, respectively, for the catalysts prepared in accordance with examples 6 and 7 and comparative examples 5 and 6.
Figure 5B:
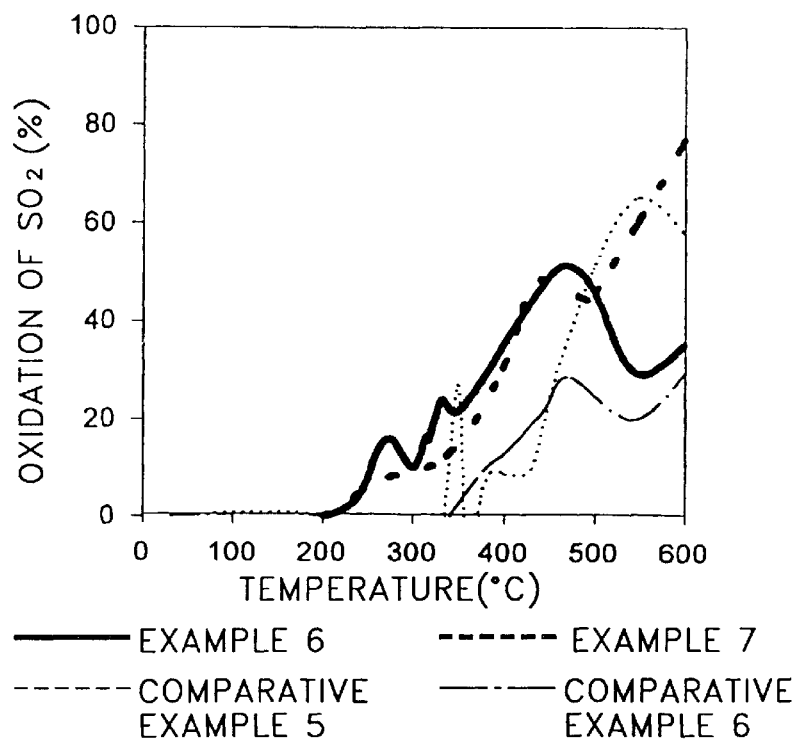

FIGS. 5A and 5B illustrate the analysis results for examples 6 and 7 and comparative examples 5 and 6. As shown in FIG. 5A, the degree of nitrogen oxide reduction was 19% at 370° C. for the catalyst of example 7 and 17% at 320° C. for the catalyst of example 6, which was two or three times the reduction of nitrogen oxide for the catalysts of comparative examples 5 and 6. Also, as shown in FIG. 5B, the degree of $SO_2$ oxidation for the catalysts of examples 6 and 7 was slightly higher than that for comparative examples 5 and 6, but this $SO_2$ oxidation can be improved by coating additional catalytic layers for particulate reduction on the carrier.

Figure 6A:
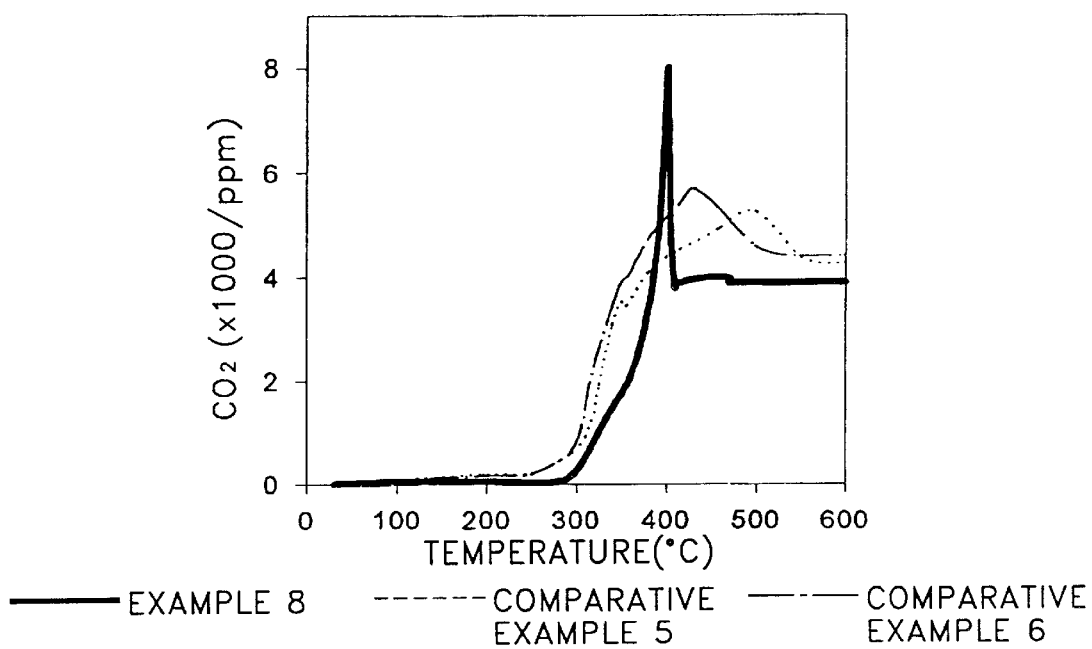
FIGS. 6A through 6C are graphs illustrating the combustion temperature of particulates, the degree of nitrogen oxide reduction, and the degree of $SO_2$ oxidation, respectively, for the catalysts prepared in accordance with example 8 and comparative examples 5 and 6.
Figure 6B:
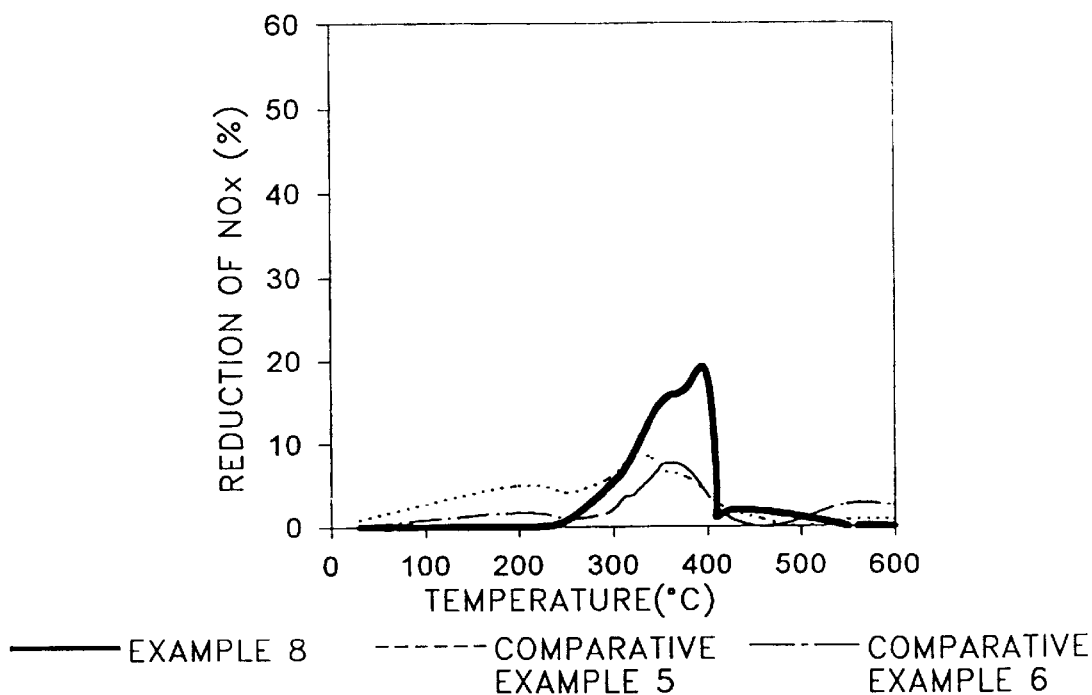
Figure 6C:
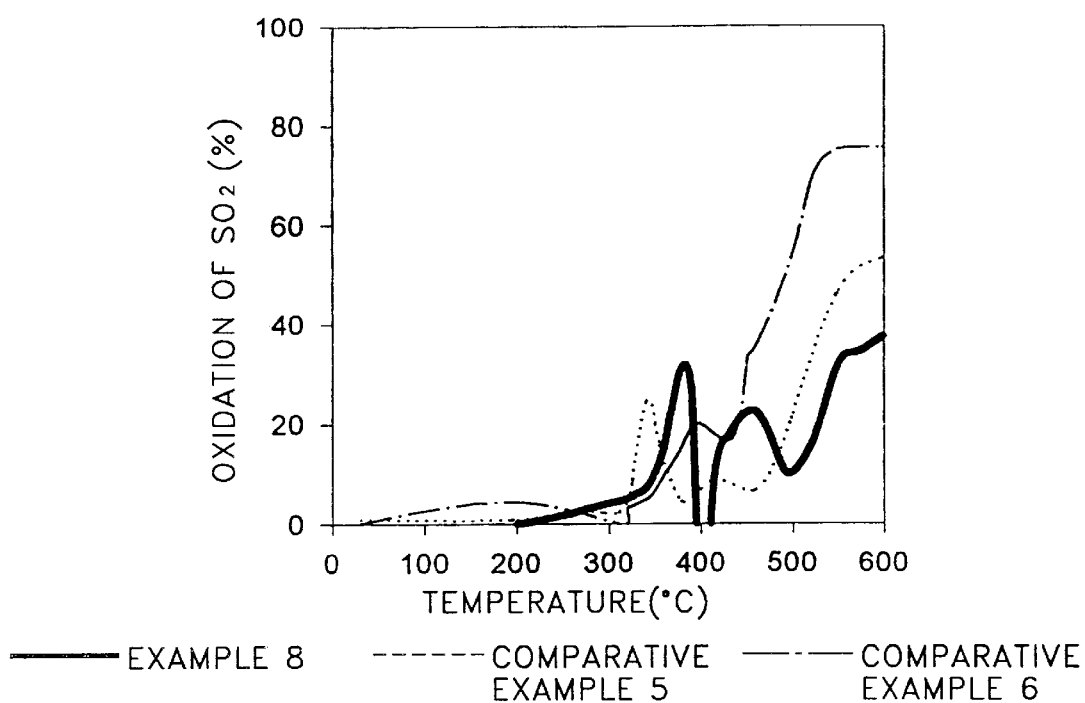

FIGS. 6A through 6C illustrate the analysis results for example 8 and comparative examples 5 and 6. The combustion temperature of particulates was 400° C. for the catalyst of example 8, which was lower compared to the catalysts of comparative examples 5 and 6, as shown in FIG. 6A. As shown in FIG. 6B, the catalyst of example 8 exhibited a high nitrogen oxide reduction of 18% in a wide temperature range from 300 to 400° C. Also, the degree of $SO_2$ oxidation was very low for the catalyst of example 8 as shown in FIG. 6C.

(2) Smog Removal Performance Test

Figure 7:
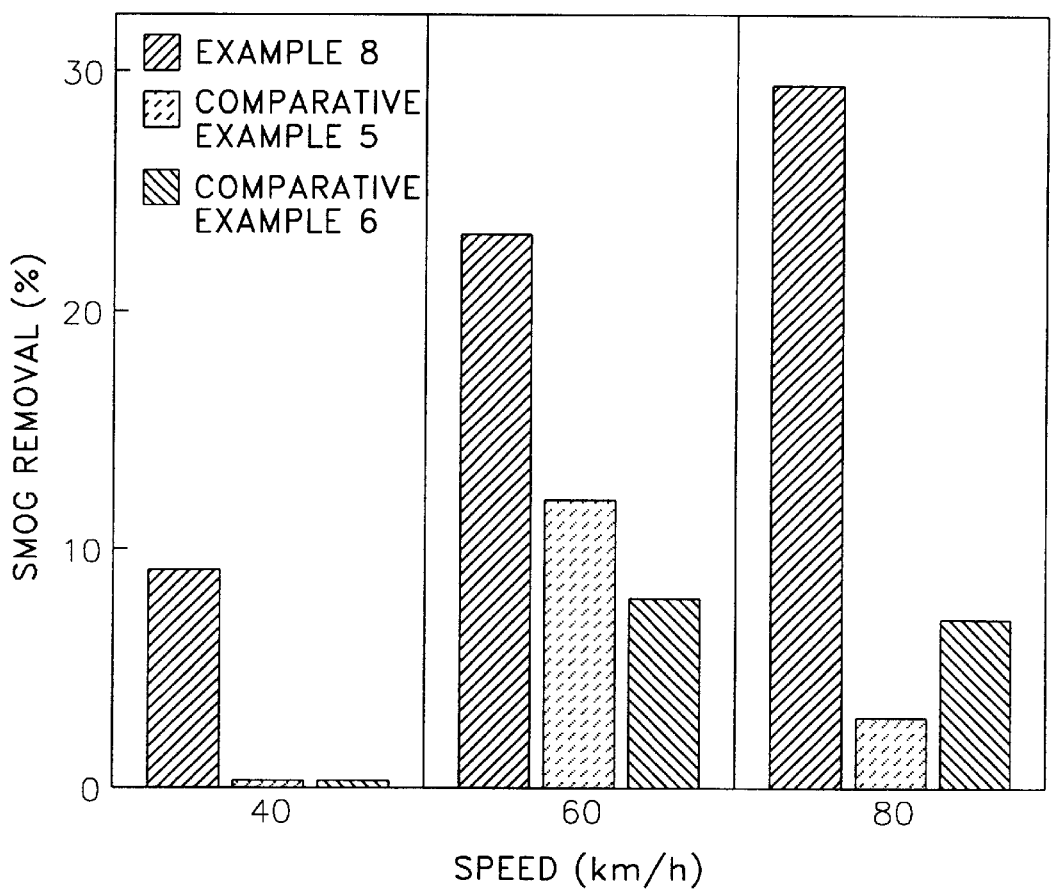
FIG. 7 is a graph illustrating the smog removal efficiency of the catalysts prepared in accordance with example 8 and comparative examples 5 and 6 during a sudden speed rise of a diesel engine.

Smog removal performance during a sudden speed rise was measured for the catalysts of example 8 and comparative examples 5 and 6. For the test, the catalysts were loaded separately into a vehicle carrying a supercharged direct injection type 4-cylinder diesel engine (displacement 2600 cc), and each vehicle was driven at a speed of 40, 60 and 80 km/h. A predetermined portion of exhaust gas through an exhaust pipe was sucked with a pump and filtered off with filter paper. Then, the concentration of smog was read by converting light reflection by the contaminated filter paper to current. The results are presented in FIG. 7. As shown in FIG. 7, the catalyst of example 8 exhibited a much higher smog removal efficiency for the entire speed range compared to the catalysts of comparative examples 5 and 6. In particular, it should be noted that the smog removal efficiency by the catalyst of example 8 was about 10%, even at a speed of 40 km/h at which particulates are barely removed.

As described above, in the catalysts for purifying exhaust gases from a diesel engine, the amount of Pt and Pd, which are precious metals, preferably is restricted to less than 0.3 wt % and 0.8 wt %, respectively, based on the weight of carrier. However, irrespective of the reduced amount of precious metal, the combustion temperature of particulates is decreased to 400° C. or less, which is considerably low relative to the 500° C. or more typically encountered with conventional catalysts, under a simulated exhaust gas atmosphere containing 10% or more moisture, and 200 ppm $SO_2$. Also, the particulate burning efficiency by the catalysts of the present invention is better than that by the catalysts of the comparative examples, which are considered to have a good particulate burning efficiency. As for the purification of nitrogen dioxide, the catalysts of the present invention exhibited a purification efficiency of 18% or more in a temperature range of 300 to 400° C., which is 8% higher than the purification efficiency of conventional catalysts for nitrogen dioxide. In addition to the good nitrogen dioxide purification performance, the catalysts of the present invention contributed to reducing the oxidation of $SO_2$, so that there is no concern about secondary production of particulates. Furthermore, the catalysts of the present invention exhibited a higher smog removal efficiency of 20% or more on average during a sudden speed rise from 40 to 100 km/h.

While this invention has been particularly shown and described with reference to preferred embodiments thereof, it will be understood by those skilled in the art that various changes in form and details may be made therein without departing from the spirit and scope of the invention. All documents described herein are hereby incorporated by reference in their entirety.

What is claimed is:

1. A catalyst for purifying exhaust gases from diesel engines comprising:

a first catalytic layer comprising a carrier portion containing iron (Fe)-doped modified zirconium dioxide, and a catalyst portion containing a material selected from the group consisting of copper (Cu), copper oxide, and mixtures thereof; and a second catalytic layer comprising a carrier portion containing copper (Cu)-doped modified zirconium dioxide, a main catalyst portion containing platinum (Pt) and tin (Sn), and a co-catalyst portion containing copper oxide.

2. The catalyst of claim 1, wherein the Cu, copper oxide, or mixtures thereof in the first catalytic layer is present in an amount within the range of from about 0.5 to about 5 wt %, based on the weight of the carrier portion of the first catalytic layer.

3. The catalyst of claim 1, wherein the Fe-doped modified zirconium dioxide and/or the Cu-doped modified zirconium dioxide comprises $SO_4^{2-}$ in an amount within the range of from about 1 to about 5 wt %, based on the weight of the modified zirconium dioxide, and wherein the Fe-doped modified zirconium dioxide and/or the Cu-doped modified zirconium dioxide has a specific surface area of 80 to 130 $m^2$/gram.

4. The catalyst of claim 1, wherein the Fe in the carrier portion of the first catalytic layer is present in an amount within the range of from about 3 to about 6 wt %, based on the weight of the Fe-doped modified zirconium dioxide.

5. The catalyst of claim 1, wherein the Cu in the carrier portion of the second catalytic layer is present in an amount within the range of from about 3 to about 6 wt %, based on the weight of the Cu-doped modified zirconium dioxide.

6. The catalyst of claim 1, wherein each of Pt and Sn in the second catalytic layer is present in an amount within the range of from about 0.05 to about 0.3 wt %, based on the weight of the carrier portion of the second catalytic layer.

7. The catalyst of claim 1, wherein the copper oxide in the co-catalyst portion of the second catalytic layer has a particle size of 0.1 to 10 µm, and is present in an amount within the range of from about 10 to about 30 wt %, based on the weight of the main catalyst portion of the second catalytic layer.

8. The catalyst of claim 1, wherein the first catalytic layer is coated on a heat-resistant three-dimensional structure together with alumina spheres having an average particle size within the range of from about 50 to about 100 µm, and the second catalytic layer is coated on the first catalytic layer.

9. The catalyst of claim 8, wherein the alumina spheres are present in an amount within the range of from about 5 to about 30 wt %, based on the weight of the carrier portion of the first catalytic layer.

10. The catalyst of claim 8, wherein the heat-resistant three-dimensional structure is selected from the group consisting of an open-flow ceramic honeycombed structure, a wall-flow ceramic honeycomb monolithic structure, and an open-flow metal honeycombed structure, and combinations thereof.

11. The catalyst as claimed in claim 1, wherein the catalyst is a high-temperature active catalyst.

12. A catalyst for purifying exhaust gases from diesel engines, comprising:
    a first catalytic layer comprising a carrier portion containing iron (Fe)-doped modified zirconium dioxide, and a catalyst portion containing palladium (Pd); and
    a second catalytic layer comprising a carrier portion containing copper (Cu)-doped modified zirconium dioxide, a main catalyst portion containing platinum (Pt) and tin (Sn), and a co-catalyst portion containing copper oxide.

13. The catalyst of claim 12, wherein the Pd in the first catalytic layer is present in an amount within the range of from about 0.2 to about 0.8 wt %, based on the weight of the carrier portion in the first catalytic layer.

14. The catalyst of claim 12, wherein the Fe-doped and/or the Cu-doped modified zirconium dioxide comprises $SO_4^{2-}$ in an amount within the range of from about 1 to about 5 wt %, based on the weight of the modified zirconium dioxide, and wherein the Fe-doped modified zirconium dioxide and/or the Cu-doped modified zirconium dioxide has a specific surface area of 80 to 130 $m^2$/gram.

15. The catalyst of claim 12, wherein the Fe in the carrier portion of the first catalytic layer is present in an amount within the range of from about 3 to about 6 wt %, based on the total weight of the Fe-doped modified zirconium dioxide.

16. The catalyst of claim 12, wherein the Cu in the carrier portion of the second catalytic layer is present in an amount within the range of from about 3 to about 6 wt %, based on the weight of the Cu-doped modified zirconium dioxide.

17. The catalyst of claim 12, wherein each of Pt and Sn in the second catalytic layer is present in an amount within the range of from about 0.05 to about 0.3 wt %, based on the weight of the carrier portion of the second catalytic layer.

18. The catalyst of claim 12, wherein the copper oxide in the co-catalyst portion of the second catalytic layer has a particle size of 0.1 to 10 $\mu$m, and is present in an amount within the range of from about 10 to about 30 wt %, based on the weight of the main catalyst portion of the second catalytic layer.

19. The catalyst of claim 12, wherein the first catalytic layer is coated on a heat-resistant three-dimensional structure together with alumina spheres having an average particle size within the range of from about 50 to about 100 $\mu$m, and the second catalytic layer is coated on the first catalytic layer.

20. The catalyst of claim 19, wherein the alumina spheres are present in an amount within the range of from about 5 to about 30 wt %, based on the weight of the carrier portion of the first catalytic layer.

21. The catalyst of claim 19, wherein the heat-resistant three-dimensional structure is selected from the group consisting of an open-flow ceramic honeycombed structure, a wall-flow ceramic honeycomb monolithic structure, and an open-flow metal honeycombed structure, and combinations thereof.

22. The catalyst as claimed in claim 12, wherein the catalyst is a low temperature active catalyst.

23. A catalyst for purifying exhaust gases from diesel engines, comprising at least two catalysts connected in series, whereby a first catalyst comprises:
    a first catalytic layer comprising a carrier portion containing iron (Fe)-doped modified zirconium dioxide, and a catalyst portion containing a material selected from the group consisting of copper (Cu), copper oxide, and mixtures thereof; and
    a second catalytic layer comprising a carrier portion containing copper (Cu)-doped modified zirconium dioxide, a main catalyst portion containing platinum (Pt) and tin (Sn), and a co-catalyst portion containing copper oxide;

and whereby a second catalyst comprises
    a first catalytic layer comprising a carrier portion containing iron (Fe)-doped modified zirconium dioxide, and a catalytic portion containing palladium (Pd); and
    a second catalytic layer comprising a carrier portion containing copper (Cu)-doped modified zirconium dioxide, a main catalyst portion containing platinum (Pt) and tin (Sn), and a co-catalyst portion containing copper oxide.

24. An exhaust system for a diesel engine comprising a gas inlet portion and a gas outlet portion, whereby the exhaust system includes the catalyst as claimed in claim 23, and wherein the first catalyst is a high-temperature active catalyst disposed in the gas inlet portion, and the second catalyst is a low-temperature active catalyst disposed in the gas outlet portion.

* * * * *